(12) United States Patent
Lee et al.

(10) Patent No.: US 8,074,083 B1
(45) Date of Patent: Dec. 6, 2011

(54) CONTROLLING DOWNLOAD AND PLAYBACK OF MEDIA CONTENT

(75) Inventors: Wai Fun (Aaron) Lee, Mountain View, CA (US); Marius P. Schilder, Sunnyvale, CA (US); Jason D. Waddle, Oakland, CA (US); J. Alex Halderman, Princeton, NJ (US)

(73) Assignee: Google Inc., Mountain View, CA (US)

( * ) Notice: Subject to any disclaimer, the term of this patent is extended or adjusted under 35 U.S.C. 154(b) by 1015 days.

(21) Appl. No.: 11/621,464

(22) Filed: Jan. 9, 2007

(51) Int. Cl.
*G06F 12/14* (2006.01)
*G06F 11/30* (2006.01)

(52) U.S. Cl. ........................................................ 713/194

(58) Field of Classification Search .................... 713/194
See application file for complete search history.

(56) References Cited

U.S. PATENT DOCUMENTS

| | | | | |
|---|---|---|---|---|
| 4,783,798 A * | 11/1988 | Leibholz et al. | ............... | 713/155 |
| 6,289,455 B1 | 9/2001 | Kocher et al. | | |
| 6,683,954 B1 | 1/2004 | Searle | | |
| 7,647,507 B1 * | 1/2010 | Feng | ............................. | 713/193 |
| 2002/0053030 A1 * | 5/2002 | Weng et al. | ..................... | 713/201 |
| 2007/0061800 A1 * | 3/2007 | Cheng et al. | ................... | 717/170 |

OTHER PUBLICATIONS

Anderson, N., "Hacking Digital Rights Management," Ars Technica, LLC, Jul. 18, 2006, [online] [retrieved on Mar. 27, 2007] Retrieved from the Internet: <URL: http://arstechnica.com/articles/culture/drmhacks.ars>.

Cohen, J., "Enabling DRM on Windows Media High Definition Video DVD ROM Discs," Microsoft Corporation, Mar. 2005, [online] [retrieved on Mar. 27, 2007] Retrieved from the Internet: <URL: http://download.microsoft.com/download/8/7/2/872a01c2-858f-42f2-bd2e-bc47a4971e8e/WMVHDDVD9_1.DOC>.

"Cryptography Concepts" in "IBM Systems—iSeries: Networking: Cryptographic hardware," International Business Machines Corporation;Feb. 2006, pp. 2-7, Version 5, Release 4, [online] [retrieved on Mar. 27, 2007] Retrieved from the Internet: <URL:http://publib.boulder.ibm.com/infocenter/iseries/v5r4/topic/rzajc/rzajc.pdf>.

Keromytis, A. D., et al., "A Survey of Randomization Techniques Against Common Mode Attacks," Technical Report DU-CS-05-04, Department of Computer Science, Apr. 2005, pp. 1-38, Drexel University, Philadelphia, PA, [online] [retrieved on Mar. 27, 2007] Retrieved from the Internet: <URL: http://www.cs.drexel.edu/static/reports/DU-CS-05-04.pdf>.

(Continued)

*Primary Examiner* — Kambiz Zand
*Assistant Examiner* — Aubrey Wyszynski
(74) *Attorney, Agent, or Firm* — Fenwick & West LLP

(57) ABSTRACT

Systems and methods provide for controlling download and playback of media content. A system includes a client, which can play content, and a server. The server includes a permission system that can determine whether a client request to download or play content should be granted. All purchase, download, and playback requests require permission from the permission system. The server also includes a DD module system that transfers a DD module to the client. The DD module includes a content key decryption module, a content decryption module, and a content decompression module. The content key decryption module decrypts an encrypted content key that was received from the server. The decryption uses a unique DD module key that has been hard-coded into the content key decryption module. The content decryption module uses the content key to decrypt encrypted content. The content decompression module decompresses compressed content so that it can be played.

22 Claims, 6 Drawing Sheets

OTHER PUBLICATIONS

Kocher, P., et al., "Self-Protecting Digital Content," Cryptography Research, Inc., 2002-2003, pp. 1-14, [online] [retrieved on Mar. 27, 2007] Retrieved from the Internet: <URL: http://www.cryptography.com/resources/whitepapers/SelfProtectingContent.pdf>.

Kocher, P., "Self-Protecting Digital Content (presentation slides)," RSA Conference, Feb. 27, 2004, [online] [retrieved on Mar. 27, 2007] Retrieved from the Internet: <URL: http://www.cryptography.com/resources/whitepapers/SPDC2004.pdf>.

Matyas, S.M., et al., "A key-management scheme based on control vectors," IBM Systems Journal, 1991, pp. 175-191, vol. 30, No. 2, [online] [retrieved on Mar. 27, 2007] Retrieved from the Internet: <URL: http://www.research.ibm.com/journal/sj/302/ibmsj3002E.pdf>.

"Windows Media DRM Individualization Best Practices," Microsoft Corporation, Dec. 2004, [online] [retrieved on Mar. 27, 2007] Retrieved from the Internet: <URL: http://msdn2.microsoft.com/en-us/library/ms867216.aspx>.

\* cited by examiner

Playing Content

CONTROLLING DOWNLOAD AND PLAYBACK OF MEDIA CONTENT

BACKGROUND

The present invention relates to security for media content and, more specifically, to controlling download and playback of media content.

Many systems exist for transferring and playing media content. If the content is valuable, the content owner will restrict access to the content. For example, a user might be granted access in exchange for payment. Once the user has accessed the content, however, it is relatively easy for the user to copy the content and transfer it to someone else, who can then play it freely. A content owner wants to restrict playback to authorized users without preventing these users from accessing and playing the content.

SUMMARY

The present invention provides various embodiments of methods and systems for controlling download and playback of media content. The system includes a client and a server, which are connected by a network. The client can play content. The server includes a permission system that can determine whether a request from the client to download or play content should be granted. The client-server system is designed so that all purchase, download, and playback requests require permission from the permission system. This requires the client to be connected to the server (via the network) for all such operations. The advantage of this design is that all of the rules used for permission are maintained with the permission system and therefore can be readily updated and changed as needed (e.g., to improve security, install business logic particular to a content owner, or adapt to newly-discovered fraud tactics). The permission system can thus be updated or revised, and the newly-installed operations and rules are thus applied to all transactions by all clients. Because the permission system is secure, its operations are less subject to attack by malicious parties.

The server also includes a DD module system that transfers a DD module to the client. The DD module includes a content key decryption module, a content decryption module, and a content decompression module. The content key decryption module decrypts an encrypted content key that was received from the server. The decryption uses a unique DD module key that has been hard-coded into the content key decryption module. The content decryption module uses the content key to decrypt encrypted content. The content decompression module decompresses compressed content so that it can be played.

Various levels of encryption, such as applied to the content key and to the content itself, operate to prevent malicious attacks on the client and the content. For example, the content key cannot be extracted without the DD module key. Because of the very large number of possible DD module keys (and the large number of different DD modules), an attack on an encrypted content key is also substantially prevented. Also, even if a particular instance of a DD module is compromised and the DD module key extracted, the DD module key can only be used with that particular DD module and its copies. Because of the very large number of different DD modules, the attacker would have no way of knowing with which other DD modules to use the ill-gotten DD module key, thereby rendering the DD module key essentially useless.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Described herein are systems and methods for controlling download and playback of media content. Media content, as used herein, refers to video, audio, or still images (or any combination thereof) in any format. A media content file can also include descriptive metadata, either encoded with the file or in a separate but associated file. A common example of media content is a video article including two portions—one video portion and one audio portion. However, the techniques described herein can be used with any number of file portions.

1. System Architecture

Figure 1:
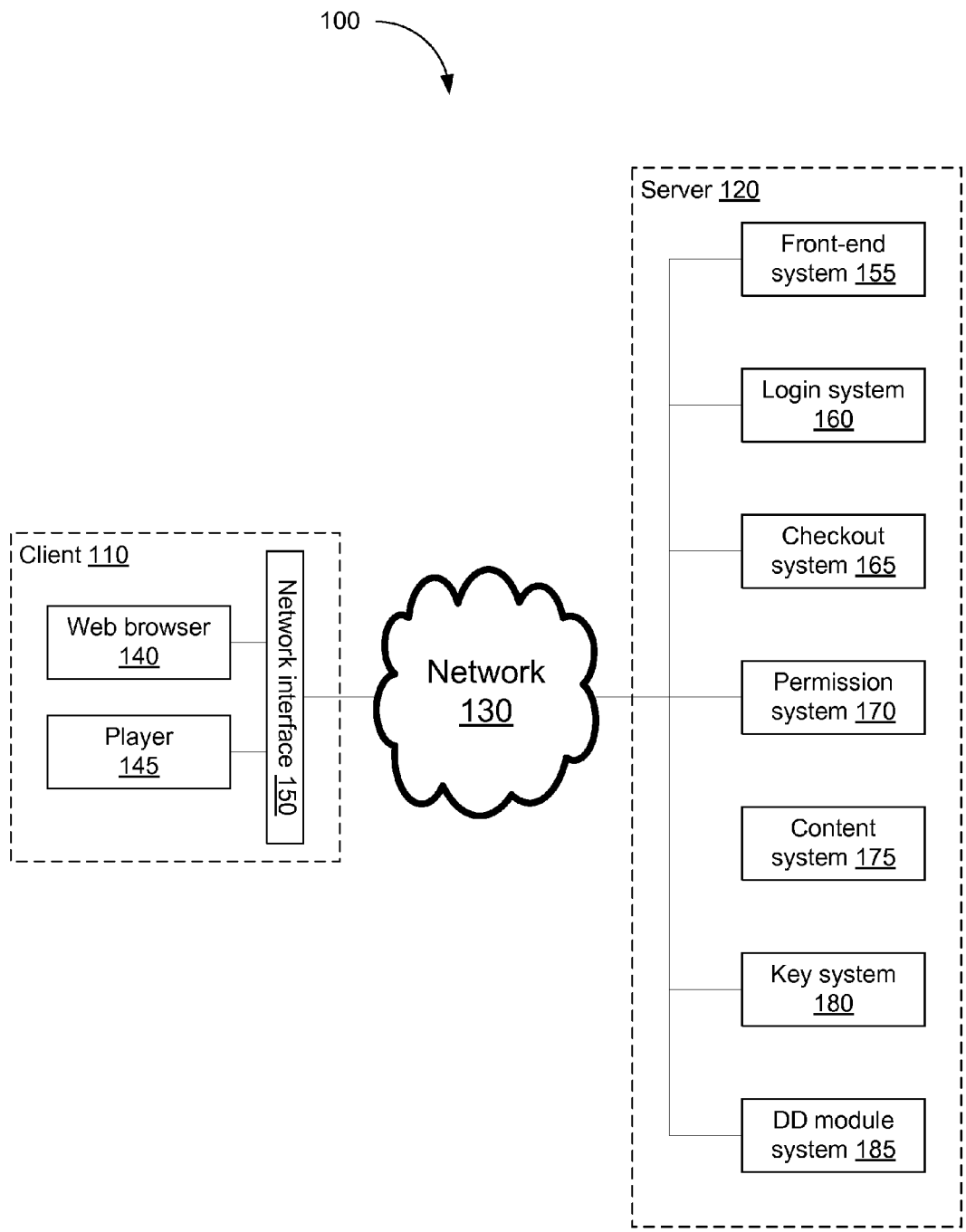
FIG. 1 is a block diagram illustrating a client-server architecture for transferring and playing media content, according to one embodiment of the invention.

In one embodiment, media content is transferred and played in the context of a client-server architecture. FIG. 1 is a block diagram illustrating a client-server architecture for transferring and playing media content, according to one embodiment of the invention. In the illustrated embodiment, the architecture 100 includes a client 110, a server 120, and a network 130. Although only one client 110 is shown for clarity, the architecture 100 can support a large number of concurrent sessions with many clients 110.

The client 110 includes a first component for displaying a user interface that enables a user to specify a media content item (such as a video clip, audio clip, or still image) for transfer from the server 120 to the client 110 via the network 130. In one embodiment, the first component is a web browser software application 140. For example, the web browser 140 displays web pages and receives user input.

The client 110 also includes a second component for playing a media content item. In one embodiment, the second component is a software application referred to as a player 145 and includes, for example, the Google Video Player from Google Inc. of Mountain View, Calif. In another embodiment, the player 145 supports automatic updating over the network 130 in order to enhance security and functionality. The player 145 will be further discussed below with reference to FIG. 5.

The client 110 receives messages from and sends messages to the network interface 150. One example of a received message is a HyperText Transfer Protocol (HTTP) message that contains a web page, such as a web page that enables a user to select a media content item. One example of a sent message is an HTTP message that contains a content identifier (content ID). The content ID identifies a particular content item that the user wants to be transferred to the client 110. Other messages will be described below with reference to FIGS. 2, 3, 4, and 6.

The client also includes a network interface 150 for communicating with the network 130 and with the server 120 (via the network 130). In one embodiment, the network interface 150 is configured to communicate using protocols such as Transmission Control Protocol (TCP)/Internet Protocol (IP). However, the network interface 150 can support additional communication protocols, such as wireless protocols (e.g., cellular, Bluetooth, IEEE 802.11, IEEE 802.16, and the like). The web browser 140 and the player 145 are communicatively coupled to the network interface 150.

The client 110 is any type of computing device, such as a workstation, a desktop computer, a laptop computer, a tablet computer, a personal digital assistant (PDA), a cellular phone, or any other type of computing device. In one embodiment, the client 110 is of conventional design and includes a processor, an addressable memory, and other conventional features such as a display, local memory, and input/output ports (not illustrated). One or more of the components of the client 110 can be located remotely and accessed via a network. The client 110 can be implemented on a device running any of a number of operating systems, such as Linux, UNIX, an operating system from Microsoft Corporation of Redmond, Wash., Apple Computer, Inc. of Cupertino, Calif., or Palm Source, Inc. of Sunnyvale, Calif., and/or other operating systems.

The server 120 is a logical grouping that includes various back-end components. In the illustrated embodiment, the back-end components include a front-end system 155, a login system 160, a checkout system 165, a permission system 170, a content system 175, a key system 180, and a decryption-decompression (DD) module system 185. The components can be implemented as a single device or as multiple computer devices such as computer processors and associated storage devices. Examples of devices include servers, mainframe computers, networked computers, processor-based devices, and similar types of systems and devices. In one implementation, the server 120 includes one or more high-performance server-class computers. In the illustrated embodiment, the back-end components are communicatively coupled to each other and to the network 130.

The details of the hardware aspects of the back-end components are known to those of skill in the art and are not further described herein. The server 120 and its associated devices need not be physically co-located, and there need not be any predefined mapping between storage devices and server computers. The server processor can be any of a number of computer processors, such as processors from Intel Corporation of Santa Clara, Calif. and Motorola Corporation of Schaumburg, Ill. In one embodiment, the server 120 has sufficient processing power and bandwidth to perform the tasks described herein.

The network 130 communicatively couples the client 110 and the server 120. In one embodiment, the network 130 includes a partially-public or wholly-public network such as the Internet. In other embodiments, the network 130 includes a private network or one or more distinct or logical private networks (e.g., virtual private networks or local area networks). Communication links to and from the network 130 can be wired or wireless (e.g., terrestrial- or satellite-based transceivers). In one embodiment, the network 130 is a packet-switched network such as an IP-based wide or metropolitan area network that uses the Ethernet protocol.

The front-end system 155 generates a media pointer. A media pointer is a file that enables the player 145 to retrieve a particular content item from the server 120. In one embodiment, the media pointer includes a Uniform Resource Locator (URL), the content ID ("docid") of the content item, the duration of the content item (e.g., in seconds or milliseconds), the title of the content item, and the description of the content item. One example of a media pointer is a Google Video Pointer (.gvp file) from Google Inc.

The contents of an exemplary media pointer are as follows:
url:http://contentsystem/
videodownload?secureurl=encrypteddata&begin=0&
len=196129 &docid=1576201954945838082
docid:1576201954945838082
duration:196129
title:Kelly Clarkson—Behind These Hazel Eyes
description:Kelly Clarkson Getting Ready For Her Wedding, Kelly Clarkson Playing With A Band,Kelly Clarkson Running In A Tattered Wedding Dress,Kelly Clarkson Wallowing In Mud,Kelly Clarkson Running Out Of Her Wedding In the above example, the URL is http://contentsystem/videodownload?secureurl=encrypteddata&begin=0&len=196129&docid=1576201954945838082. The "contentsystem" portion of the URL represents the address of the content system 175. The URL includes four variables: secureurl, begin, len, and docid. The "secureurl" variable, which is set to "encrypteddata," identifies encrypted data, as explained below. The "begin" variable, which is set to 0, identifies the beginning of the requested portion of the content item (e.g., as an offset in seconds or milliseconds). The "len" variable, which is set to 196129, identifies the length of the requested portion of the content item (e.g., in seconds or milliseconds). The "docid" variable, which is set to 1576201954945838082, identifies the content ID of the content item.

Within the URL, the value of the "secureurl" variable is generated based on the user ID of the user who requested the content, the value of the docid variable (i.e., the content ID of the requested content), the value of the begin variable (i.e., an identifier of the beginning of the requested content portion), and the value of the len variable (i.e., an identifier of the length of the requested content portion). The value is generated using a media pointer key. The media pointer key is used to encrypt and decrypt the secureurl portion of the URL that is contained within the media pointer. The media pointer key is known only to the server 120, not to the client 110. In one embodiment, the same media pointer key is used for multiple media pointers, regardless of the user ID or content ID involved.

The front-end system 155 also sends and receives various messages, as described below with reference to FIGS. 2 and 3.

The login system 160 performs user validation and authentication (e.g., based on credentials such as a user identifier ("user ID") and password). In one embodiment, the login system 160 stores account information for each user such as user ID, password, real name, email address, street address, phone number, and payment information. Payment information includes, for example, a credit card number, expiration date, and billing address. In one embodiment, the login system 160 also validates payment information. The login system 160 also sends and receives various messages, as described below with reference to FIGS. 2, 3, and 6.

The checkout system 165 enables a user to buy a content item. For example, the user indicates a particular item. This item is placed in a virtual "shopping cart." When the user is finished adding items to the shopping cart, he purchases the items using a "checkout" procedure. The checkout procedure processes the user's payment in exchange for the contents of the shopping cart. The checkout system 165 also sends and receives various messages, as described below with reference to FIG. 2.

The permission system 170 maintains records that describe transaction events (e.g., purchases, downloads, and playbacks) related to a particular user and a particular content item. In one embodiment, a transaction record includes a user ID, a content ID, a transaction ID, and a transaction status. The transaction status indicates whether a purchase was successful. A transaction record also includes a list of download event descriptions and a list of playback event descriptions. A download includes information such as IP address, content key, content key ID, and timestamp. A playback includes information such as IP address and timestamp.

Based on the contents of a transaction record, the permission system 170 determines whether a particular download request or playback request is permitted. Download permission and playback permission can be based on one or more factors. The factors include payment requirements, limitations on the number of downloads or playbacks of the content by a particular user account, legal restrictions on particular users (based on age, location, etc.), limitations on the types of clients, and limitations on the network location, type, bandwidth, or other functional features. These constraints or limitations can be established by the content owner, the system operator, or others with control or ownership of the content. Some examples are as follows:

The permission system 170 can determine that a particular user must pay for the content item or that the content item is free of charge. The permission system 170 can also determine that a particular user has exceeded a maximum number of download requests or playback requests for the content item. As another example, the permission system can determine whether the user is legally restricted from downloading or playing the content because the user is younger than a minimum age requirement.

The permission system 170 can use a transaction record to determine whether a set of requests indicates unusual or forbidden conduct. If it does, the permission system 170 can disable the user's account. In one embodiment, the permission system 170 analyzes the number of attempted requests (successful and/or unsuccessful) within a particular time window (e.g., one week). In another embodiment, if a user's account is being shared by multiple people, the account is suspended.

The permission system 170 also generates a content key, which is used to encrypt and decrypt content. The content key is unique for each download. In one embodiment, the content key is generated dynamically based on the user (e.g., user ID), the content (e.g., content ID), and the access (e.g., time/date stamp). For example, the content key is derived using a keyed one-way function such as HMAC-SHA1 (keyed-hash message authentication code-secure hash algorithm). In another embodiment, the key is a strong random alpha-numeric string. The content key is, for example, a 128-bit Advanced Encryption Standard (AES) key.

The permission system 170 also creates a digital rights management (DRM) header for each download. The DRM header includes the user ID of the user that requested the content, the content ID of the requested content, a content key ID that uniquely identifies the content key, and the version of the decryption-decompression (DD) module needed to play the content. (DD modules will be described below with reference to FIG. 5.) In one embodiment, the version information includes both a major version and a minor version (e.g., 2.3, where 2 is the major version and 3 is the minor version). The DRM header is encrypted using a DRM header key. In one embodiment, this encryption is performed using AES and a 128-bit key. The DRM header key is known only to the server 120, not to the client 110. In one embodiment, the same DRM header key is used for multiple DRM headers, regardless of the user ID or content ID involved.

The permission system 170 also sends and receives various messages, as described below with reference to FIGS. 2, 3, 4, and 6.

The content system 175 has access to files that represent media content items such as video clips, audio clips, and/or still images. The content system 175 also has access to metadata about these items. In one embodiment, metadata includes information about the content itself, such as title, author or artist, and year of publication. In another embodiment, metadata includes management information about the content item, such as a content ID and how much money (if any) a user must pay to access the item.

The content system 175 compresses content before it is sent in order to save bandwidth. For example, the content system 175 compresses video files using a video codec such as DivX from DivX, Inc. of San Diego, Calif. or MPEG-4 from the Moving Picture Experts Group working group of the ISO/IEC (International Organization for Standardization/International Electrotechnical Commission). The content system 175 compresses audio files using an audio codec such as RealAudio from RealNetworks, Inc. of Seattle, Wash. or MPEG-1 Audio Layer 3 ("MP3") from the MPEG working group of the ISO/IEC. The content system 175 also encrypts (compressed) content using a content key. This content key is created each time an item of content is to be transmitted to a client 110. In one embodiment, encryption is performed using modified AES. The content system 175 also decrypts portions of URLs within media pointers using a media pointer key. The content system 175 also sends and receives various messages, as described below with reference to FIGS. 3 and 4.

The key system 180 encrypts content keys using decryption-decompression (DD) module keys. In one embodiment, each DD module has a unique DD module key (also called a "master key"). This DD module key is derived from the DD module's identifier ("DD module ID") using a derivation key. In one embodiment, encryption of a content key is performed using the Data Encryption Standard (DES), and the DD module key is a 56-bit DES key.

The key system 180 also decrypts encrypted DRM headers using a DRM header key. The key system 180 also sends and receives various messages, as described below with reference to FIG. 6.

The decryption-decompression (DD) module system 185 generates DD modules for use by various players 145. DD modules are used to play content that has been compressed and encrypted. In one embodiment, the DD module system 185 is capable of generating thousands (even hundreds of thousands) of different DD modules, any of which can theoretically be used with any player 145. The DD module system 185 generates a particular DD module by using a particular round-key. Each DD module uses a different round-key (i.e., round-keys for different DD modules are independent). Which particular DD module is generated and sent to a player 145 (see FIG. 6) is pseudo-random. The pseudo-randomness is based on, for example, a user's user ID and a version number of the player 145.

In one embodiment, a DD module's assembly code is obfuscated for greater security. Preferably, multiple layers of code obfuscation are used, including obfuscation of the cryptographic logic, obfuscation of the assembled code, and obfuscation of the compiled binary of the module. Further, each of the thousands of different DD modules can be obfuscated in a different manner. Thus, even if a particular module is compromised by an attacker, the only use of that is to decrypt content that is already associated with that particular module.

The DD module system 185 also sends and receives various messages, as described below with reference to FIG. 6. DD modules will be discussed below with reference to FIG. 5.

The system architecture 100 and purchase, download, and playback processes (described below with reference to FIGS. 2, 3, 4, and 6) provide several beneficial features. The system is designed so that all purchase, download, and playback requests require permission from the permission system 170. This requires the client 110 to be connected to the server 120 (via the network 130) for all such operations. The advantage of this design is that all of the rules used for permission are maintained with the permission system 170 and therefore can be readily updated and changed as needed (e.g., to improve security, install business logic particular to a content owner, or adapt to newly-discovered fraud tactics). The permission system 170 can thus be updated or revised, and the newly-installed operations and rules are thus applied to all transactions by all clients 110.

By contrast, in a client-based permissions model, each client 110 has to be individually updated. This leads to version drift, as well as the need for the server 120 to support multiple different versions of a client 110 simultaneously. Further, because the permission system 170 is secure, its operations are less subject to attack by malicious parties. This contrasts with client-based permission systems that can be attacked by such malicious parties, who can thus more readily attempt to defeat the permission rules within the client 110.

2. Purchasing Content

Figure 2:
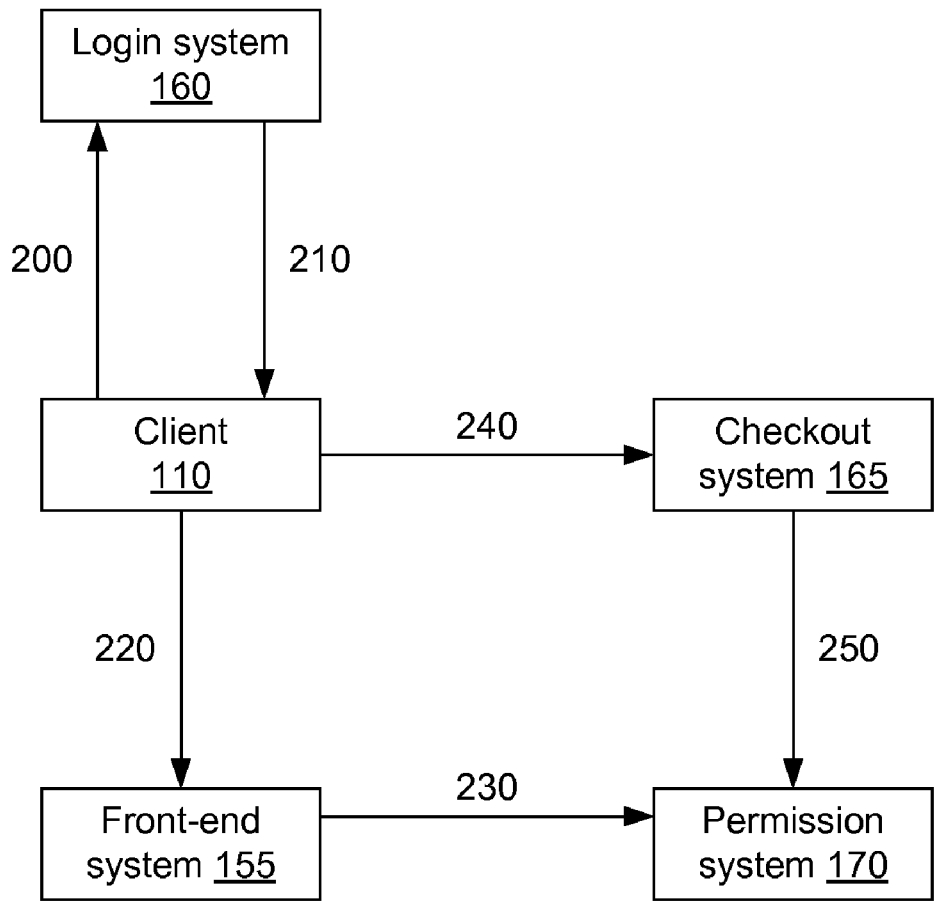
FIG. 2 is a message diagram illustrating the messages sent between various components of the system shown in FIG. 1 in order to purchase content, according to one embodiment of the invention.

FIG. 2 is a message diagram illustrating the messages sent between various components of the system shown in FIG. 1 in order to purchase content. Each arrow represents a message. The arrow's reference number indicates the contents of the message and the operations associated with the sending of the message and its receipt, as follows:

200: The user logs in from the client 110. Specifically, client 110 sends to the login system 160 a set of credentials (e.g., a user identifier ("user ID") and a password). The user ID is an email address or any other type of useful identifier for a user. The login system 160 then attempts to authenticate the user.

210: If the credentials are correct, the login system 160 sends to the client 110 an authentication token ("auth token").

220: The user indicates a particular content item to purchase. This can be done through a user interface that displays content items to the user, in various categories and lists and via browsing and searching functions. User interfaces for selecting and providing access to content are well-known and are not further described here. Once the user has selected a particular item of content, the client 110 sends to the front-end system 155 the auth token and a content ID that is associated with the selected content. The front-end system 155 creates a shopping cart that contains the content purchase information. In one embodiment, this information includes the user ID (based on the auth token), the content ID, and information about the item (e.g., whether it is a lifetime purchase ("download-to-own") versus a rental and, if it's a rental, the expiration date/time).

230: The transaction is logged. The front-end system 155 sends to the permission system 170 the user ID and the content ID. The permission system creates a transaction record for the user ID and the content ID pair.

240: The purchase is made. The client 110 sends to the checkout system 165 the user ID, the content ID, and the auth token. The checkout system 165 accesses the shopping cart to complete the purchase.

250: The transaction is updated. The checkout system 165 sends to the permission system 170 the user ID, the content ID, a transaction identifier, and the status of the transaction. Assume that the status indicates that the purchase was successful. The permission system 170 locates the transaction record for the user ID and the content ID and updates it with the transaction identifier and the transaction status, thereby indicating that the user has purchased the content.

At this point in time, the user has purchased the content.

3. Initiating Download of Content

Figure 3:
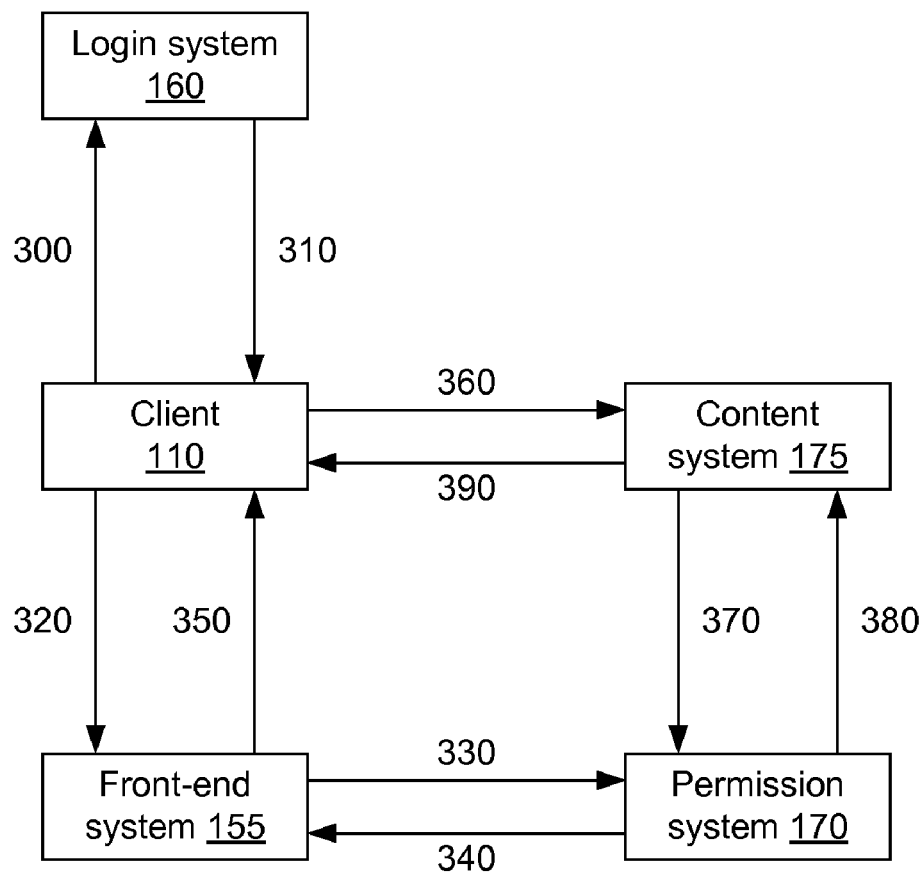
FIG. 3 is a message diagram illustrating the messages sent between various components of the system shown in FIG. 1 in order to initiate downloading content, according to one embodiment of the invention.

FIG. 3 is a message diagram illustrating the messages sent between various components of the system shown in FIG. 1 in order to initiate downloading content. Each arrow represents a message. The arrow's reference number indicates the contents of the message and the operations associated with the sending of the message and its receipt, as follows:

300: If the user is not logged in, he logs in. This is similar to 200 in FIG. 2.

310: If the user has not been authenticated, he is authenticated. This is similar to 210 in FIG. 2.

320: The user indicates a particular content item to download. This can be done, for example, by the user accessing his account and selecting the content item from a list of previously requested and/or purchased content. The client 110 sends to the front-end system 155 the user ID, the auth token, and a content ID.

330: Permission for the download is requested. The front-end system 155 sends to the permission system 170 the user ID and the content ID. The permission system 170 locates the appropriate transaction record based on the user ID and the content ID. Based on the contents of the record, the permission system 170 determines whether the download is permitted. As noted above, the permission system 170 can use a variety of different rules to determine whether the download is permitted. For example, even if the user has purchased the content, the permission system 170 can deny the download request if the user has already downloaded the content a maximum number of times.

340: Permission for the download is granted. If the download is permitted, the permission system 170 generates a media pointer and sends it to the front-end system 155. The media pointer identifies the requested content.

350: The media pointer is delivered. The front-end system 155 generates a media pointer that includes a URL with an encrypted portion. The front-end system 155 then sends the media pointer to the client 110. The front-end system 155 also sends a copy of the media pointer key to the content system 175 so that the content system can subsequently decrypt the encrypted portion of the media pointer.

360: The download is initiated. The client 110 sends to the content system 175 the media pointer with the encrypted URL. The content system 175 decrypts the encrypted portion of the media pointer (using the media pointer key) to reveal the user ID and the content ID. The content system 175 uses the content ID and the user ID to retrieve the requested content from storage.

370: The download is logged. The content system 175 sends to the permission system 170 the user ID and the content ID. The permission system 170 generates a content key. The permission system 170 also locates the appropriate transaction record based on the user ID and the content ID and adds a download event description to the "downloads" portion of the record with the content key, a content key identifier, a timestamp, and the IP address of the client 110. The permission system 170 also creates a DRM header for this item of content (as described above) and encrypts it using the DRM header key. The permission system 170 also sends a copy of the DRM header key to the key system 180 so that the key system can subsequently decrypt the DRM header.

380: The permission system 170 sends to the content system 175 the content key and the encrypted DRM header. The content system 175 uses the content key to encrypt the requested content. As noted above, the content key was generated to be unique to this particular download transaction by the user.

390: The content is transferred. The content server 175 embeds the encrypted DRM header within the encrypted, compressed content and transfers the data to the client 110.

At this point in time, the encrypted, compressed content and accompanying encrypted DRM header are located at the client 110.

4. Resuming Download of Content

If the requested content item is large, it is possible that the download will be interrupted before the entire content item has been transferred. In this situation, download is resumed in order to obtain the remaining portion of the content.

Figure 4:
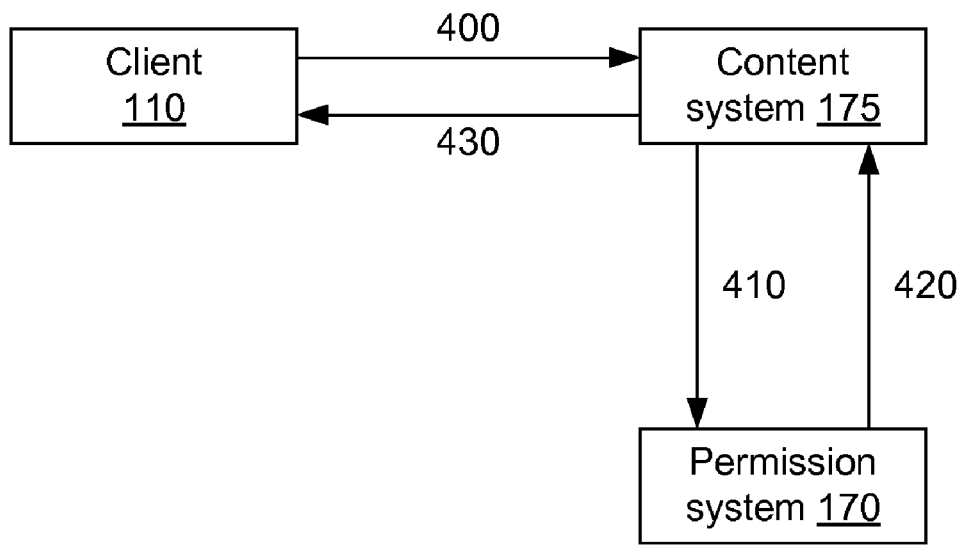
FIG. 4 is a message diagram illustrating the messages sent between various components of the system shown in FIG. 1 in order to resume downloading content, according to one embodiment of the invention.

FIG. 4 is a message diagram illustrating messages sent between various components of the system shown in FIG. 1 in order to resume downloading content. Each arrow represents a message. The arrow's reference number indicates the contents of the message and the operations associated with the sending of the message and its receipt, as follows:

400: The download is initiated. The client 110 sends to the content system 175 the media pointer with the encrypted portion, the encrypted DRM header, and a span that indicates desired content (e.g., content that has not yet been transferred). In one embodiment, the span includes a beginning index and a duration. The index and duration can be measured in various units, such as bytes, blocks, seconds, milliseconds, or frames. If the beginning index is 0 and the duration is the length of the content, then the request is for the entire content item.

410: The content key is requested. The content system 175 decrypts the encrypted portion of the media pointer (using the media pointer key) and decrypts the encrypted DRM header (using the DRM header key). The content system 175 then sends to the permission system 170 the user ID, the content ID, and the content key ID.

420: The content key is delivered. The permission system 170 locates the appropriate transaction record based on the user ID and the content ID. The permission system 170 sends to the content system 175 the content key ID from that record.

430: The content is transferred. The content server 175 compresses the requested content span, encrypts it using the content key, and transfers the data to the client 110.

At this point in time, the encrypted, compressed content and accompanying encrypted DRM header are located at the client 110.

5. Playing Content

A. Obtaining DD Module and Content Key

Figure 6:
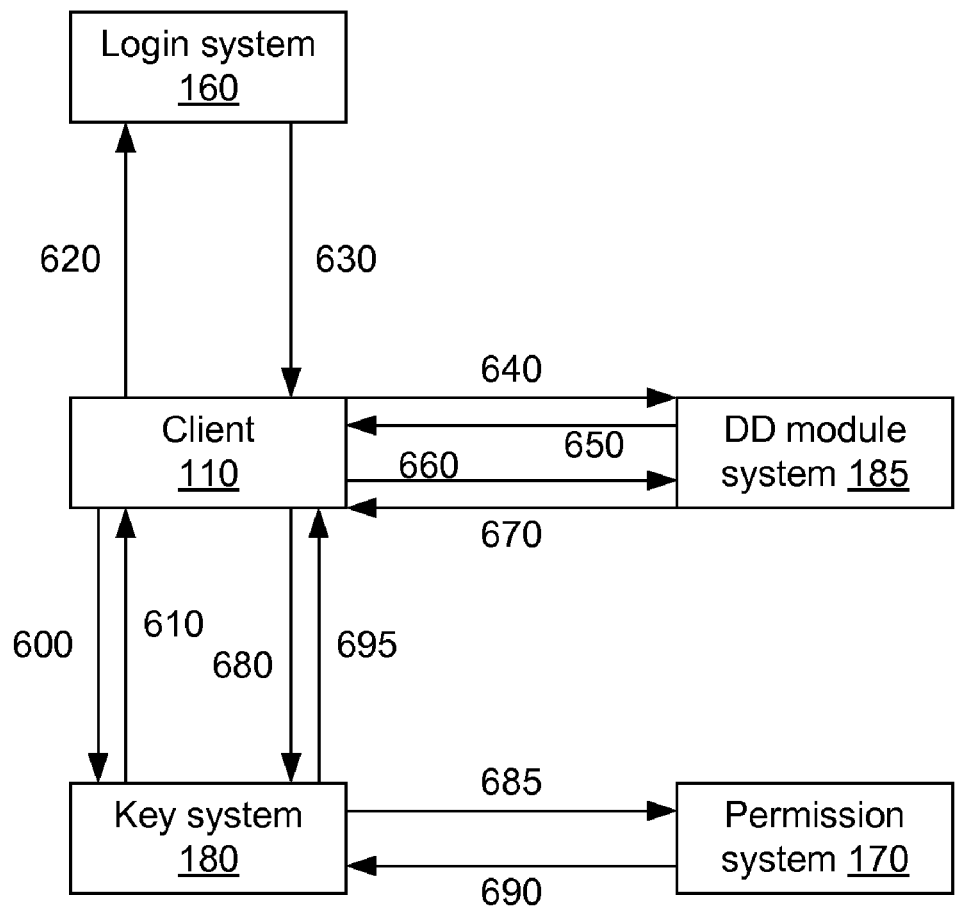
FIG. 6 is a message diagram illustrating the messages sent between various components of the system shown in FIG. 1 in order to play content, according to one embodiment of the invention.

FIG. 6 is a message diagram illustrating the messages sent between various components of the system shown in FIG. 1 in order to play content. Each arrow represents a message. The arrow's reference number indicates the contents of the message and the operations associated with the sending of the message and its receipt, as follows:

600: The user starts to log in. The client 110 sends to the key system 180 the encrypted DRM header for the content that the user wants to play. The key system 180 decrypts the DRM header (using the DRM header key) to reveal a user ID. Only this user ID can be used to play the content that was accompanied by this DRM header.

610: The user ID is delivered. The key system 180 sends to the client 110 the user ID.

620: The user enters a password that matches the user ID. The client 110 sends to the login system 160 the user ID and the password.

630: The user is authenticated. If the user ID and the password are correct, the login system 160 sends to the client 110 an auth token. The auth token authenticates the client 110 to the login system 160, thereby ensuring that the user who is requesting to play the content is the same user who purchased the content. If the purchasing user were to send the content to another user, that other user would not be able to play the content without getting the first user's password. Since the user's password provides access to the user's account, including details such as the user's credit card information, the first user is unlikely to freely provide his password to others.

640: The DD module information is requested. The client 110 sends to the DD module system 185 the encrypted DRM header, the auth token, and an identifier of the platform of the client. The DD module system 185 decrypts the encrypted DRM header to reveal the user ID and the version (major and minor) of the DD module that is needed to play the content that was accompanied by this DRM header. Note that the client 110 itself cannot decrypt the DRM header. In other words, the DRM header is completely opaque to the client 110.

650: The DD module information is delivered. The DD module system 185 sends to the client 110 the name of the version of the DD module and a DD module ID. The name of the version includes the same major and minor versions from the DRM header, in addition to a "revision" that represents the most recent revision of that major-minor pair. The DD module ID is based on the user ID and the version of the DD module. For example, the DD module ID is a cryptographic function of the user ID and the version of the DD module. Thus, the DD module ID can be determined based on the user ID and the version of the DD module, as long as the cryptographic function is known.

660: The DD module is requested. The client 110 sends to the DD module system 185 the encrypted DRM header, the auth token, the identifier of the platform of the client, and the name of the version of the DD module.

670: The DD module is delivered. The DD module system 185 sends to the client 110 a DD module that will play the content on the client's platform.

680: The content key is requested. The client 110 sends to the key system 180 the encrypted DRM header, the auth token, and a key challenge. In one embodiment, the key challenge is random and is given by the following expression:

$$\text{Encrypt}_{DDmodulekey}(\text{random\_bytes})$$

where "random bytes" represents the data stored in a random area of memory, and $\text{Encrypt}_{DDmodulekey}(\text{random bytes})$ means encrypt the value of "random bytes" using the DD module key. The "random area of memory" is where the content key will be stored once it has been decrypted, as explained below.

685: Permission for the playback is requested. The key system 180 sends to the permission system 170 the user ID and the content ID. The permission system 170 locates the appropriate transaction record based on the user ID and the content ID. Based on the contents of the record, the permission system 170 determines whether the playback is permitted. As noted above, the permission system 170 can use a variety of different rules to determine whether the playback is permitted. For example, even if the user has purchased the content, the permission system 170 can deny the playback request if the user has already played the content a maximum number of times.

690: Permission for the playback is granted. If the playback is permitted, the permission system 170 sends this information to the key system 180.

695. Assuming that playback is permitted, the encrypted content key is delivered. The key system 180 sends to the client 110 an encrypted content key. The content key is the same content key that was used to encrypt the content. Assuming that the key challenge is given by the expression $\text{Encrypt}_{DDmodulekey}(\text{random bytes})$, the encrypted content key is determined as follows: The key system 180 determines a "delta" value, which is given by the expression XOR(random bytes, content_key), where XOR is the bit-wise exclusive-or operator. The key response (i.e., the encrypted content key) is then given by the expression $\text{Encrypt}_{DDmodulekey}(\text{delta})$. Later, in order to determine the content key, the key response is decrypted using the DD module key, which is known to the client 110. (This yields the delta.) Then, the delta is XOR'ed over the "random area of memory" (whose data was used in the key challenge. The key challenge bytes cancel out. As a result, the random area of memory now stores the content key.

At this point in time, the encrypted content key is located at the client 110. The client 110 can now decrypt and decompress the content, as described below.

B. Decrypting and Decompressing Content

Figure 5:
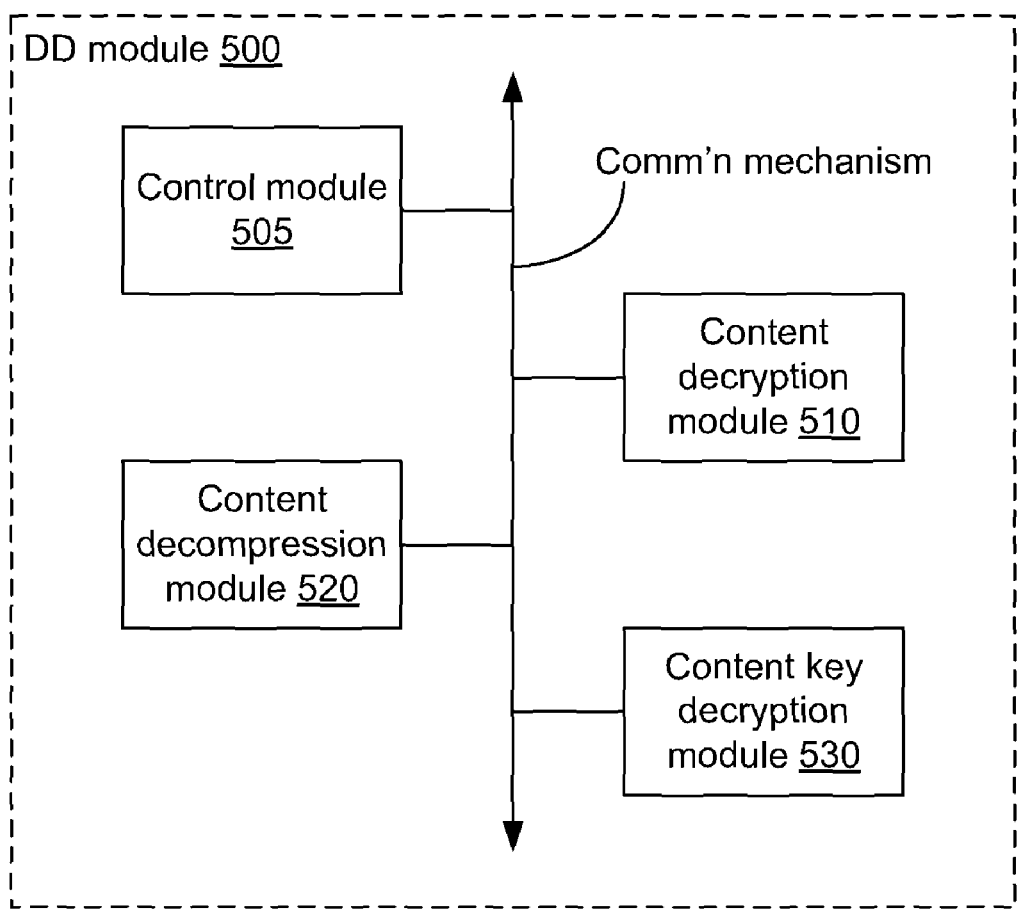
FIG. 5 is a block diagram illustrating a decryption-decompression (DD) module, according to one embodiment of the invention.

In order to play the encrypted, compressed content, the player 145 in the client 110 uses a decryption-decompression (DD) module. FIG. 5 is a block diagram illustrating a DD module 500, according to one embodiment of the invention. In the illustrated embodiment, the DD module 500 includes a control module 505, a content decryption module 510, a content decompression module 520, a content key decryption module 530, and a communication mechanism. The communication mechanism communicatively the couples the control module 505, the content decryption module 510, the content decompression module 520, and the content key decryption module 530 to each other.

The content decryption module 510 decrypts content using a content key. This content key is the same content key that was generated by the permission system 170 and used to encrypt the content (see FIGS. 3 and 4).

The content decompression module 520 decompresses content. For example, if the content is a video clip, the content decompression module 520 is a video codec such as DivX or MPEG-4. If the content is an audio clip, the content decompression module 520 is an audio codec such as RealAudio or MP3.

The content key decryption module 530 decrypts a content key using a DD module key (also called a "master key"). The DD module key is the same DD module key that was used by the key system 180 to encrypt the content key. In one embodiment, after the content key has been decrypted, it is stored in non-consecutive memory locations for greater security.

The control module 505 controls operation of the DD module 500. In order to play the content that has been encrypted and compressed, the control module 505 performs the following tasks: Decrypt the encrypted content key using a DD module key and the content key decryption module 530. (This yields the content key.) Decrypt the encrypted, compressed content using the content key and the content decryption module 510. (This yields the compressed content.) Decompress the compressed content using the content decompression module 520. (This yields the uncompressed content, which can then be played.)

In other words, the DD module 500 uses two keys: a content key and a DD module key. The content key (which is used to decrypt content) is received from the key system 180 (see FIG. 6). In contrast, the DD module key (which is used to decrypt the content key) is "built-in" to the DD module 500.

Due to the code obfuscation of the DD module 500 and the content key decryption module 530, the DD module key cannot be readily extracted from the DD module by malicious parties. In one embodiment, the content key decryption module 530 is an implementation of the DES decryption algorithm, and thus the DD module key is a DES key. Instead of the content key decryption module 530 taking a key value as a parameter, the key value is "hard-coded" into the decryption logic of the module. For example, instead of decryption source code including a branch statement based on a key value, the source code instead takes the appropriate branch automatically because the key is already known.

As can now be appreciated, the system architecture 100 and associated processes provide for greater security and control than previous DRM approaches. The use of entirely server-side permission and authentication afford the capability to better control the access, purchase, download, and playback of content. Further, the various levels of encryption, and in particular the separate encryption of the DRM header (using a key unknown to the client 110), the content key (using a key built into the DD module 500 within the player 145 of the client 110), and the content (using the unique content key), operate to prevent malicious attacks on the player 145 and the content.

For example, because the DRM header is encrypted using a key that is never exposed to the client 110, an attacker would generally be unable to identify the necessary DD module 500. Further, the content key itself cannot be extracted without the DD module key. Because of the very large number of possible DD module keys (and the large number of different DD modules 500), an attack on an encrypted content key is also substantially prevented. As noted above, even if a particular instance of a DD module 500 is compromised and the DD module key extracted, the DD module key can only be used with that particular DD module 500 and its copies. Because of the very large number of different DD modules 500, the attacker would have no way of knowing with which other DD modules 500 to use the ill-gotten DD module key, thereby rendering the DD module key essentially useless (except for decrypting content keys (and, therefore, content) that have been received by the client 110 for use with that particular DD module).

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for controlling playback of encrypted media content, comprising:
    a client sending a key challenge and a client-opaque encrypted DRM header to a server, the DRM header comprising an identifier indicating a decryption-decompression module for use by the client in playing the encrypted media content;
    the server determining whether playback is allowed;
    responsive to the server determining that playback is allowed, the server sending a key response, and the decryption-decompression module to the client;
    the client determining a content key based on the key response; and
    the client decrypting the encrypted media content by using the content key and the received decryption-decompression module.

2. A method for controlling playback of encrypted media content, comprising:
    receiving a request for an encrypted content key, the request comprising a client-opaque encrypted DRM header, the DRM header comprising an identifier indicating a decryption-decompression module for use by a client in playing the encrypted media content;
    determining whether playback is allowed; and
    responsive to determining that playback is allowed:
        sending the encrypted content key to the client; and
        sending the decryption-decompression module associated with the identifier to the client for use in playing the encrypted media content.

3. A method for decrypting encrypted media content, comprising:
    sending a request for an encrypted content key, the request comprising a client-opaque encrypted DRM header, and the DRM header comprising an identifier indicating a decryption-decompression module for use by a client in playing the encrypted media content;
    receiving the encrypted content key;
    receiving a decryption-decompression module associated with the identifier from a server;
    decrypting the encrypted content key to obtain a content key by using the decryption-decompression module; and
    decrypting the encrypted media content using the content key.

4. The method of claim 3, wherein the decryption-decompression module includes a content key decryption module having a built in master key.

5. The method of claim 3, wherein the request for the encrypted content key includes a key challenge.

6. The method of claim 3, wherein the request for the encrypted content key includes an authentication token that authenticates a user.

7. The method of claim 3, wherein decrypting the encrypted content key comprises decrypting the encrypted content key using the Data Encryption Standard (DES).

8. The method of claim 3, wherein decrypting the encrypted media content comprises decrypting the encrypted media content using the Advanced Encryption Standard (AES).

9. The method of claim 3, wherein decrypting the encrypted media content using the content key comprises using a content decryption module included with the decryption-decompression module and the content key.

10. The method of claim 4, wherein the built-in master key is determined based on a unique identifier of the content key decryption module.

11. The method of claim 3, further comprising: sending a request for the decryption-decompression module.

12. The method of claim 11, wherein the request for the decryption-decompression module includes an identification of a version of the decryption-decompression module.

13. The method of claim 12, wherein the identification of the version of the decryption-decompression module is encrypted.

14. The method of claim 11, wherein the request for the decryption-decompression module includes an authentication token that authenticates a user.

15. The method of claim 11, wherein the request for the decryption-decompression module identifies a computing platform.

16. The method of claim 3, further comprising:
sending a request for an identification of a version of the decryption-decompression module; and
receiving the identification of the version of the decryption-decompression module.

17. The method of claim 16, wherein the request for the identification of the version of the decryption-decompression module includes encrypted data, wherein the encrypted data includes the identification of the version of the decryption-decompression module.

18. A computer program product for controlling playback of encrypted media content, comprising:
a non-transitory computer-readable storage medium;
computer program code, encoded on the medium, for:
receiving a request for an encrypted content key, the request comprising a client-opaque encrypted DRM header, and the DRM header comprising an identifier indicating a decryption-decompression module for use by a client in playing the encrypted media content;
determining whether playback is allowed; and
responsive to determining that playback is allowed:
sending the encrypted content key; and
sending a decryption-decompression module.

19. A computer program product for decrypting encrypted media content, comprising:
a non-transitory computer-readable storage medium;
computer program code, encoded on the medium, for:
sending a request for an encrypted content key, the request comprising a client-opaque encrypted DRM header, and the DRM header comprising an identifier indicating a decryption-decompression module for use by a client in playing the encrypted media content;
receiving the encrypted content key;
receiving a decryption-decompression module from a server;
decrypting the encrypted content key to obtain a content key by using the decryption-decompression module; and
decrypting the encrypted media content using the content key.

20. A system for controlling playback of encrypted media content, comprising:
a receiving module configured to receive a request for an encrypted content key, the request comprising a client-opaque encrypted DRM header, and the DRM header comprising an identifier indicating a decryption-decompression module for use by a client in playing the encrypted media content;
a determining module configured to determine whether playback is allowed; and
a sending module configured to responsive to determining that playback is allowed:
send the encrypted content key; and
send the decryption-decompression module.

21. A system for decrypting encrypted media content, comprising:
a sending module configured to send a request for an encrypted content key, the request comprising a client-opaque encrypted DRM header, and the DRM header comprising an identifier indicating a decryption-decompression module for use by a client in playing the encrypted media content;
a receiving module configured to receive the encrypted content key and receive a decryption-decompression module from a server;
a first decrypting module configured to decrypt the encrypted content key to obtain a content key by using a decryption-decompression module; and
a second decrypting module configured to decrypt the encrypted media content using the content key.

22. A system for controlling playback of encrypted media content, comprising:
a client configured to send a key challenge and a request to a server, the key challenge comprising an encrypted portion of memory on the client, the request comprising a client-opaque encrypted DRM header, and the DRM header comprising an identifier indicating a decryption-decompression module for use by the client in playing the encrypted media content; the encrypted portion of memory used to determine a content key based on a key response, and the decryption-decompression module used to decrypt the encrypted media content by using the content key; and
a server configured to determine whether playback is allowed and, if playback is allowed, to send the key response and the decryption-decompression module to the client.

* * * * *